(12) United States Patent
Nakano et al.

(10) Patent No.: US 12,179,836 B2
(45) Date of Patent: Dec. 31, 2024

(54) STEERING CONTROL APPARATUS, STEERING CONTROL METHOD, AND STEERING CONTROL SYSTEM

(71) Applicant: Hitachi Astemo, Ltd., Hitachinaka (JP)

(72) Inventors: Hiroshi Nakano, Yokohama (JP); Tomoaki Fujibayashi, Atsugi (JP); Kazuya Takahashi, Sagamihara (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 875 days.

(21) Appl. No.: 17/272,833

(22) PCT Filed: Aug. 2, 2019

(86) PCT No.: PCT/JP2019/030448
§ 371 (c)(1),
(2) Date: Mar. 2, 2021

(87) PCT Pub. No.: WO2020/049919
PCT Pub. Date: Mar. 12, 2020

(65) Prior Publication Data
US 2021/0347409 A1      Nov. 11, 2021

(30) Foreign Application Priority Data
Sep. 3, 2018   (JP) .................................. 2018-164588

(51) Int. Cl.
*B62D 13/00* (2006.01)
*B62D 6/00* (2006.01)
*B62D 7/15* (2006.01)

(52) U.S. Cl.
CPC ............. *B62D 13/00* (2013.01); *B62D 6/003* (2013.01); *B62D 7/159* (2013.01)

(58) Field of Classification Search
CPC ......... B62D 13/00; B62D 6/003; B62D 7/159
See application file for complete search history.

(56) References Cited

U.S. PATENT DOCUMENTS 6,523,911 B1 *   2/2003   Rupp .................... B62D 7/159
                                                    188/112 A
2005/0161901 A1   7/2005   Ahner et al.
(Continued)

FOREIGN PATENT DOCUMENTS

DE            4 127 750 C1    9/1992
DE     10 2004 004 151 A1    8/2005
(Continued)

OTHER PUBLICATIONS

German-language Office Action issued in German Application No. 11 2019 004 416.8 dated Juy 6, 2023 with English translation (12 pages).
(Continued)

*Primary Examiner* — Khoi H Tran
*Assistant Examiner* — Tristan J Greiner
(74) *Attorney, Agent, or Firm* — Crowell & Moring LLP

(57) ABSTRACT

A steering control apparatus, a steering control method, and a steering control system according to the present invention output an instruction for generating a periodic yaw moment opposite in phase from an rolling motion occurring on a hitch vehicle including a vehicle and a trailer to a rear-wheel steering apparatus configured to control a steering angle of a rear wheel of the vehicle.

4 Claims, 7 Drawing Sheets

(56) References Cited

U.S. PATENT DOCUMENTS

| | | | | |
|---|---|---|---|---|
| 2006/0229782 | A1* | 10/2006 | Deng | B62D 6/003 |
| | | | | 180/443 |
| 2009/0005946 | A1* | 1/2009 | Futamura | B60T 8/1708 |
| | | | | 701/70 |
| 2010/0332049 | A1* | 12/2010 | Sy | B60T 8/1708 |
| | | | | 701/1 |
| 2015/0314782 | A1 | 11/2015 | Haeussler et al. | |
| 2017/0361834 | A1* | 12/2017 | Paskus | B60T 8/1708 |

FOREIGN PATENT DOCUMENTS

| | | |
|---|---|---|
| DE | 10 2012 222 862 A1 | 6/2014 |
| DE | 10 2014 211 268 A1 | 12/2015 |
| JP | 8-150951 A | 6/1996 |
| JP | 2003-503276 A | 1/2003 |
| JP | 2006-21769 A | 1/2006 |
| JP | 2009-12488 A | 1/2009 |

OTHER PUBLICATIONS

International Search Report (PCT/ISA/210) issued in PCT Application No. PCT/JP2019/030448 dated Oct. 1, 2019 with English translation (five (5) pages).

Japanese-language Written Opinion (PCT/ISA/237) issued in PCT Application No. PCT/JP2019/030448 dated Oct. 1, 2019 with English translation (14 pages).

* cited by examiner

STEERING CONTROL APPARATUS, STEERING CONTROL METHOD, AND STEERING CONTROL SYSTEM

TECHNICAL FIELD

The present invention relates to a steering control apparatus, a steering control method, and a steering control system that control steering of a vehicle towing a trailer.

BACKGROUND ART

PTL 1 discloses a vehicle stabilization method that generates a periodic yaw moment opposite in phase from an rolling motion by actuating autonomous brake when the rolling motion occurs on a hitch vehicle including a subject vehicle and a trailer.

CITATION LIST

Patent Literature

PTL 1: Japanese Patent Application Public Disclosure No. 2006-021769

SUMMARY OF INVENTION

Technical Problem

However, the yaw moment generable by the autonomous brake of the vehicle may be insufficient for a large trailer and fail to effectively suppress the rolling motion.

Further, the conventional technique raises such a problem that the speed of the vehicle is unintentionally changed due to the actuation of the brake for suppressing the rolling motion.

An object of the present invention is to provide a steering control apparatus, a steering control method, and a steering control system that can suppress an rolling motion even when a further large trailer is hitched while preventing a change in the speed of the vehicle.

Solution to Problem

According to one aspect of the present invention, one exemplary embodiment thereof outputs an instruction for generating a periodic yaw moment opposite in phase from an rolling motion occurring on a hitch vehicle including a vehicle and a trailer to a rear-wheel steering apparatus configured to control a steering angle of a rear wheel of the vehicle.

According to the one aspect of the present invention, the rolling motion can be suppressed even when the large trailer is hitched while the change in the speed of the vehicle is prevented.

DESCRIPTION OF EMBODIMENTS

In the following description, embodiments of a steering control apparatus, a steering control method, and a steering control system according to the present invention will be described with reference to the drawings.

Figure 1:
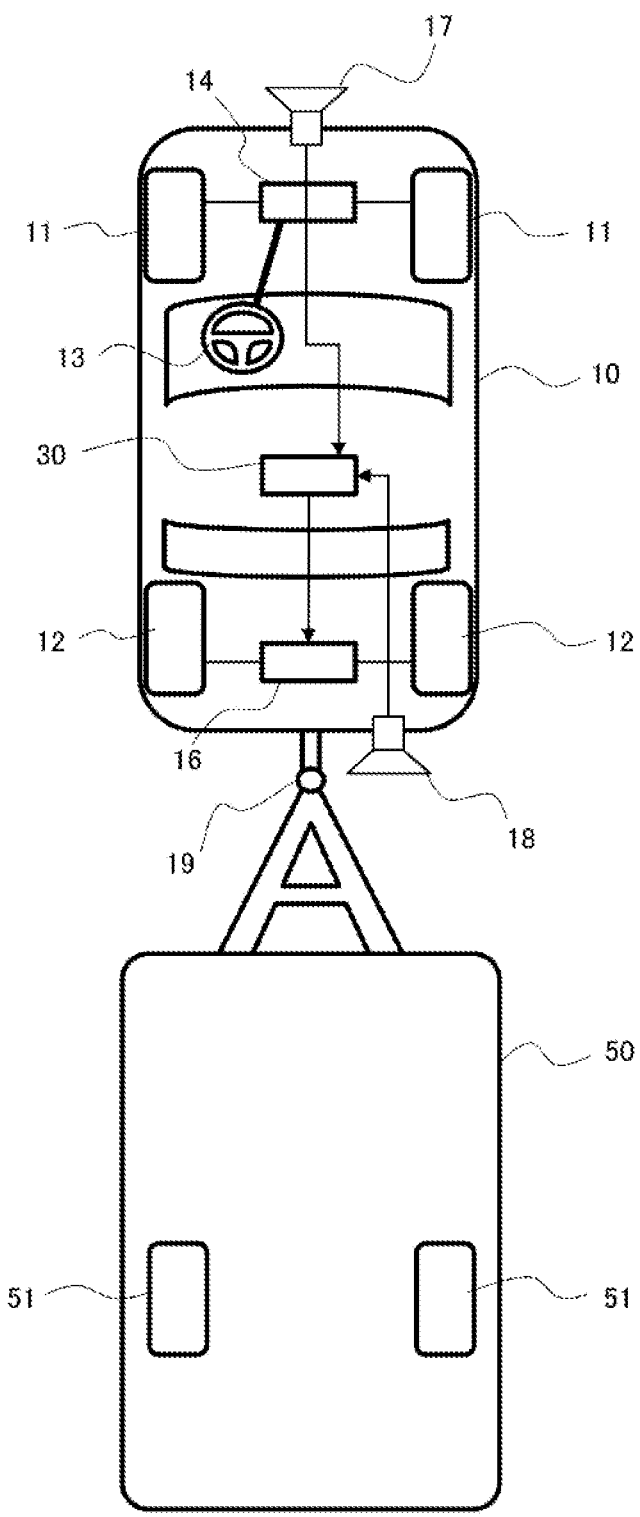
FIG. 1 schematically illustrates the configuration of a steering control system.

FIG. 1 schematically illustrates the configuration of a steering control system.

A vehicle 10 illustrated in FIG. 1 is a tow vehicle (a tractor) that tows a trailer 50 (a towed vehicle).

The vehicle 10 is a four-wheeled vehicle including a pair of front left and right wheels 11, 11 and a pair of rear left and right wheels 12, 12.

The vehicle 10 includes a front-wheel steering apparatus 14 and a rear-wheel steering apparatus 16. The front-wheel steering apparatus 14 manipulates the steering angle of the front wheels 11, 11 according to an input of a steering wheel (a driving wheel) 13 operated by a driver. The rear-wheel steering apparatus 16 includes a steering actuator that manipulates the steering angle of the rear wheels 12, 12 according to an instruction from a steering control apparatus 30 (a steering control portion).

The steering control apparatus 30 is an electronic control apparatus including a microcomputer equipped with an MPU (Microprocessor Unit) a ROM (Read Only Memory), a RAM (Random Access Memory), and the like.

Further, the vehicle 10 includes a first external world perception sensor 17 and a second external world perception sensor 18. The first external world perception sensor 17 perceives a running traffic lane and an obstacle in front of the vehicle 10. The second external world perception sensor 18 perceives an obstacle and the trailer 50 behind the vehicle 10.

The first external world perception sensor 17 and the second external world perception sensor 18 (an external world perception portion) each include, for example, a monocular camera and an image processing portion that processes an image captured by this monocular camera, and acquire perception information such as the running traffic lane, the obstacle, and the motion of the trailer by processing the image.

Alternatively, the first external world perception sensor 17 and the second external world perception sensor 18 can also acquire the perception information such as the running traffic lane, the obstacle, and the motion of the trailer by a geometry perception apparatus such as a stereo camera and a laser radar.

The vehicle 10 and the trailer 50 are hitched via a hitch portion 19 (a hitch) including, for example, a hitch ball and a hitch coupler.

On a hitch vehicle including the above-described vehicle 10 and trailer 50, an rolling motion (or a swinging motion) may occur while the hitch vehicle is running due to influences of an excessive speed, an irregular road surface, side wind, and the like.

Then, the occurrence of the rolling motion on the hitch vehicle causes the trailer 50 to vibrate around the vertical axis thereof and induce a vibration of the vehicle 10 via the hitch portion 19, thereby leading to a reduction in the stability of the hitch vehicle.

Therefore, the steering control apparatus 30 performs trailer stabilization control of controlling the rear-wheel steering angle of the vehicle 10 so as to generate a periodic yaw moment opposite in phase from the rolling motion occurring on the hitch vehicle including the vehicle 10 and the trailer 50, thereby suppressing the rolling motion with the aid of this trailer stabilization control to achieve the stabilization of the hitch vehicle.

Figure 2:
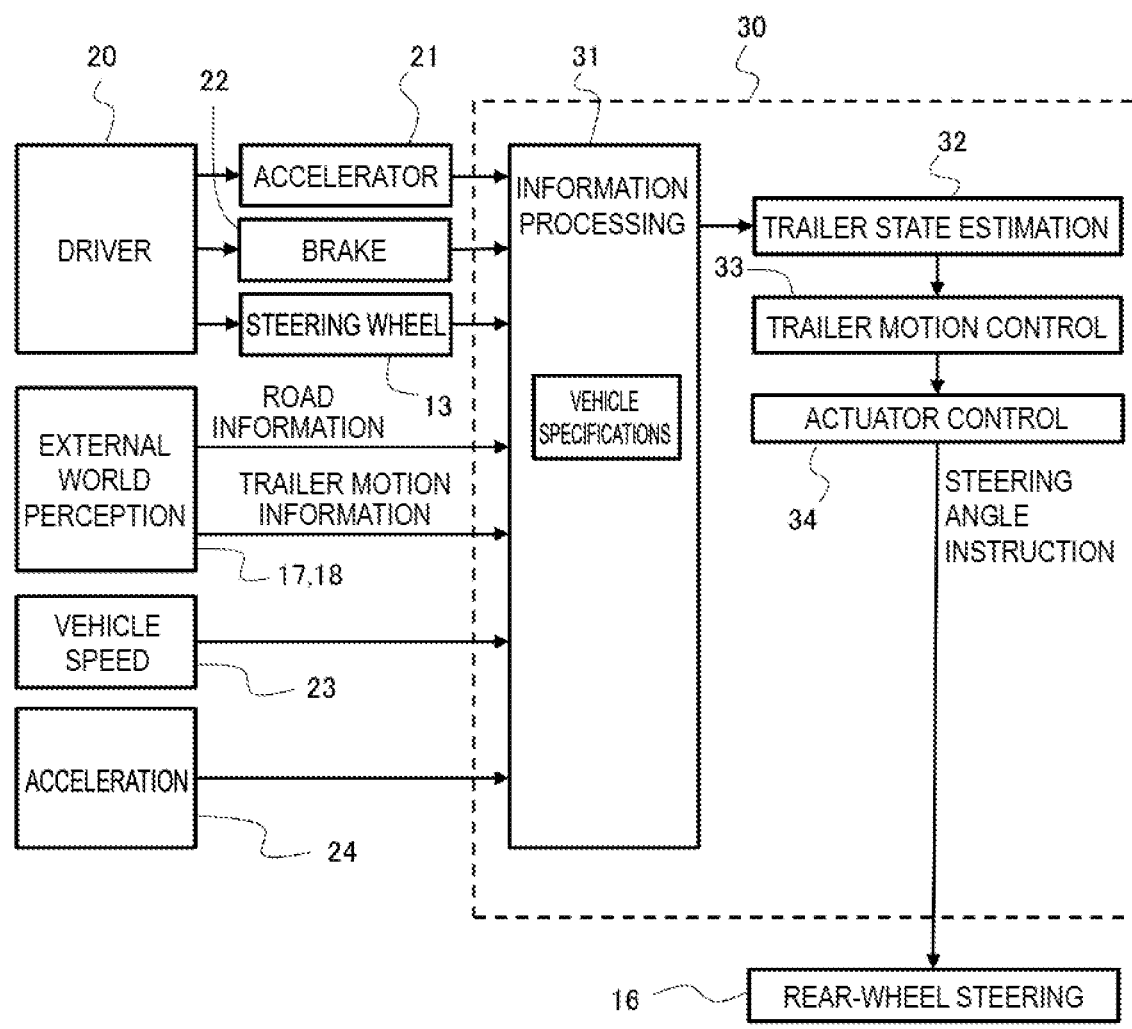
FIG. 2 is a control block diagram of a steering control apparatus.

FIG. 2 is a control block diagram of the steering control apparatus 30.

The steering control apparatus 30 inputs driver operation information including accelerator position information AO from an accelerator pedal 21 operated by a driver 20, brake pedal position information BO from a brake pedal 22 operated by the driver 20, and angular information of a steering wheel 13 operated by the driver 20.

Further, the steering control apparatus 30 inputs information regarding the running traffic lane and the obstacle in front of and behind the vehicle and further inputs information regarding the motion of the trailer 50 behind the vehicle from the external world perception sensors 17 and 18.

Further, the steering control apparatus 30 inputs information regarding a vehicle speed V, which is the vehicle body speed of the vehicle 10, from a vehicle speed sensor 23, and information regarding the longitudinal acceleration and the lateral acceleration from a longitudinal G/lateral G sensor 24.

The steering control apparatus 30 has functions as an information processing portion 31, a trailer state estimation portion 32, a trailer motion control portion 33, and an actuator control portion 34, which input the above-described various kinds of information.

The information processing portion 31 calculates the motion state of the hitch vehicle based on the driver operation information, the external world perception information, and the information about the motion state, and further based on the vehicle specification information of the vehicle 10 and the trailer 50 that is stored in a memory.

The trailer state estimation portion 32 estimates the motion state of the trailer 50 based on the motion state of the hitch vehicle calculated by the information processing portion 31.

The trailer motion control portion 33 generates a control input for stabilizing the motion state of the trailer 50 estimated by the trailer state estimation portion 32.

The actuator control portion 34 controls the rear-wheel steering angle by outputting a steering instruction to the steering actuator of the rear-wheel steering apparatus 16, with the aim of realizing the control input generated by the trailer motion control portion 33.

Figure 3:
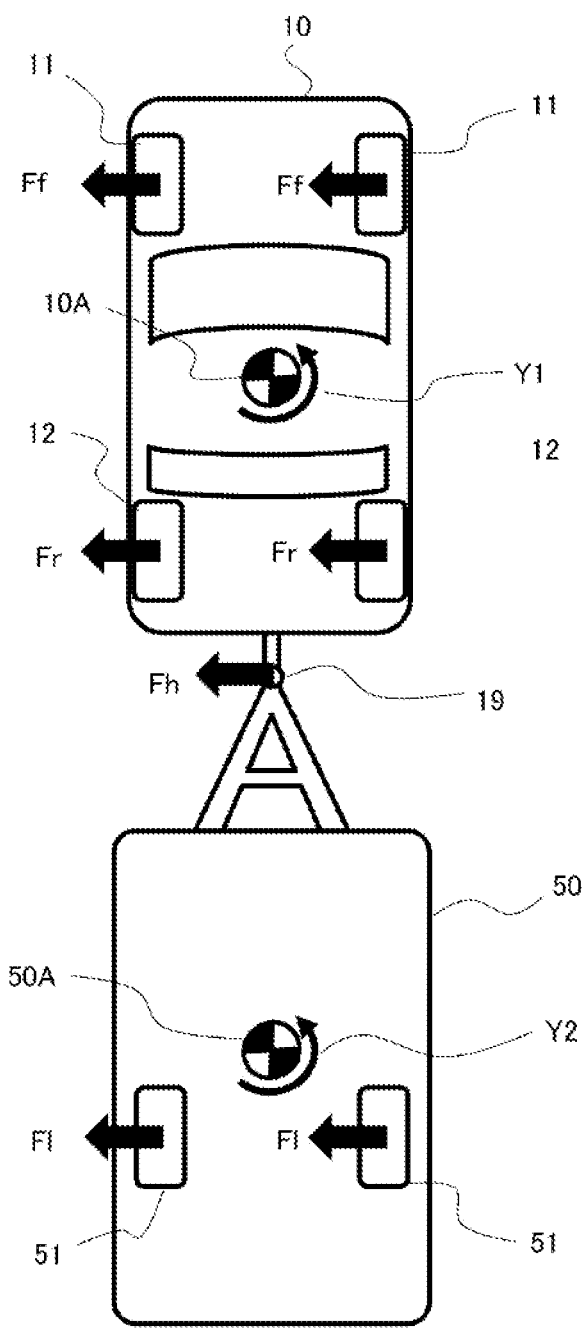
FIG. 3 illustrates the motion of a hitch vehicle including a vehicle (a tractor) and a trailer.

FIG. 3 illustrates the motion of the hitch vehicle including the vehicle (the tractor) 10 and the trailer 50.

On the hitch vehicle including the vehicle 10 and the trailer 50, a yaw rotation motion Y1 around a center of gravity 10A of the vehicle 10 is generated mainly by forces Ff transmitted from the road surface to the front wheels 11, 11 of the vehicle 10, forces Fr transmitted from the road surface to the rear wheels 12, 12 of the vehicle 10, and a force Fh added from the trailer 50 side to the hitch portion 19 and transmitted to the vehicle 10.

On the other hand, a yaw rotation motion Y2 around a center of gravity 50A of the trailer 50 is generated by the force Fh added from the trailer 50 side to the hitch portion 19 and transmitted to the vehicle 10 and forces F1 transmitted from the road surface to a pair of left and right running wheels 51, 51 of the trailer 50.

Then, the strengths of the forces Ff and Fr on the vehicle 10 are determined based on the motion state of the vehicle 10 such as a front-wheel steering angle $\delta f$, a rear-wheel steering angle $\delta r$, a side-slip angle, and the speed.

Now, focusing on the vehicle 10 alone instead of the hitch vehicle, the yaw rate generated on the vehicle 10 is determined according to the forces Ff and Fr based on the yaw moment of inertial of the vehicle 10, and therefore the steering control apparatus 30 can estimate the yaw rate of the vehicle alone by determining the forces Ff and Fr based on the motion state of the vehicle 10.

Then, the steering control apparatus 30 can estimate the force Fh (a trailer external force) by comparing the estimated yaw rate in the case of the vehicle 10 alone and the yaw rate actually generated on the vehicle 10 as the hitch vehicle.

On the other hand, provided that the vehicle specifications of the trailer 50 are known, the steering control apparatus 30 can determine the motion state of the trailer 50 such as the side-slip angle and the speed by the external world perception sensor 18 or the like measuring the yaw motion (yawing) of the trailer 50, and can estimate the forces F1 transmitted from the road surface to the running wheels 51, 51 of the trailer 50 based on them.

In this manner, the steering control apparatus 30 can estimate the state of the trailer 50 such as the yaw rate by estimating the force Fh (the trailer external force) applied to the hitch portion 19 and the forces F1 transmitted from the road surface to the running wheels 51, 51 of the trailer 50.

Then, the steering control apparatus 30 suppresses the rolling motion of the hitch vehicle by controlling the rear-wheel steering angle of the vehicle 10 based on the result of estimating the trailer state to thus manipulate the forces Fr transmitted from the road surface to the rear wheels 12, 12 of the vehicle 10, and generating a force in a direction for suppressing the yaw motion generated on the trailer 50 with the force on the hitch portion 19.

Now, because the yaw rate generated on the vehicle 10 and the trailer 50 due to the rolling motion of the hitch vehicle is periodically changed, the control on the rear-wheel steering angle by the steering angle control apparatus 30 corresponds to an instruction for generating a periodic yaw moment opposite in phase from the rolling motion.

Mounting a yaw rate sensor or an acceleration sensor on the trailer 50 allows the steering control apparatus 30 to detect the forces F1 transmitted from the road surface to the running wheels 51, 51 of the trailer 50 directly from the sensor output.

Figure 4:
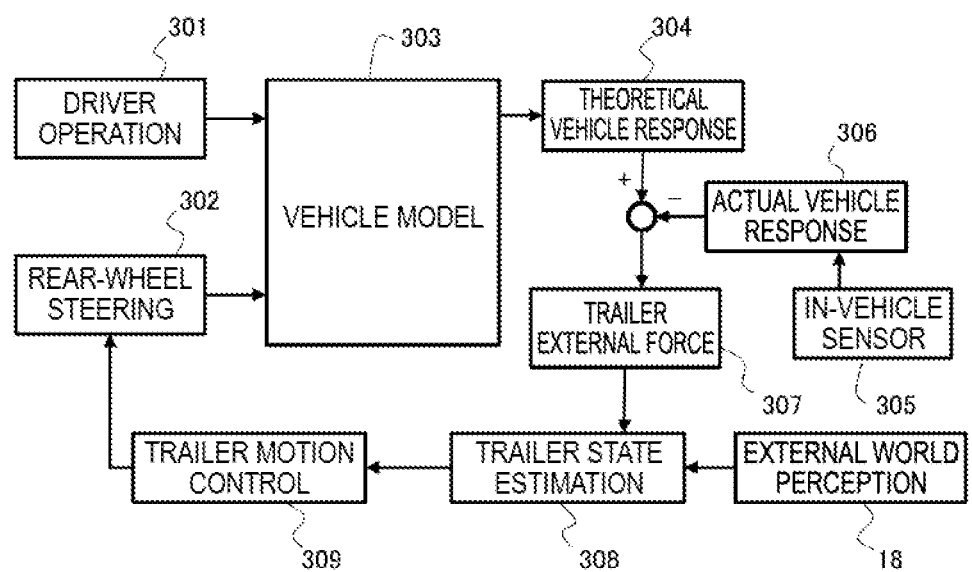
FIG. 4 is a control block diagram of the steering control apparatus.

FIG. 4 is a control block diagram of the steering control apparatus 30.

The steering control apparatus 30 first inputs driver's operation information 301 such as the accelerator position information AO, the brake position information BO, and the steering wheel angle information, and information about a rear-wheel steering angle 302 to a vehicle model 303 based on the vehicle specifications, and calculates a theoretical vehicle response 304 that would be returned when the vehicle 10 is alone.

Further, the steering control apparatus 30 determines an actual vehicle response 306 based on the vehicle motion information (the information regarding the motion state of the vehicle 10) from an in-vehicle sensor 305 (a vehicle motion state acquisition portion) such as the vehicle sensor 23 and the longitudinal G/lateral G sensor 24.

Then, the steering control apparatus 30 estimates a trailer external force 307 applied to the vehicle 10 (the force Fh added from the trailer 50 side to the hitch portion 19 and transmitted to the vehicle 10) based on the difference between the theoretical vehicle response 304 and the actual vehicle response 306.

Further, the steering control apparatus 30 estimates a trailer state 308 such as the force applied to the trailer 50 and the yaw moment based on the trailer external force 307 and the motion of the trailer 50 perceived by the external world perception sensor 18.

Then, the steering control apparatus 30 calculates the yaw moment for suppressing the yaw motion of the trailer 50 by trailer motion control 309, and actually generates the yaw moment for suppressing the yaw motion of the trailer 50 by changing the rear-wheel steering angle 302.

At this time, if a yaw motion exceeding a threshold value is generated on the trailer 50, i.e., the yaw motion of the trailer 50 exceeds an allowable level, the steering control apparatus 30 generates a yaw moment for supplying such a yaw motion of the trailer 50 to reduce the yaw motion of the trailer 50.

The steering control apparatus 30 can measure the trailer motion with use of the yaw rate sensor or the acceleration sensor mounted on the trailer 50, a sensor that measures the angle of the hitch portion 19, or the like.

Figure 5:
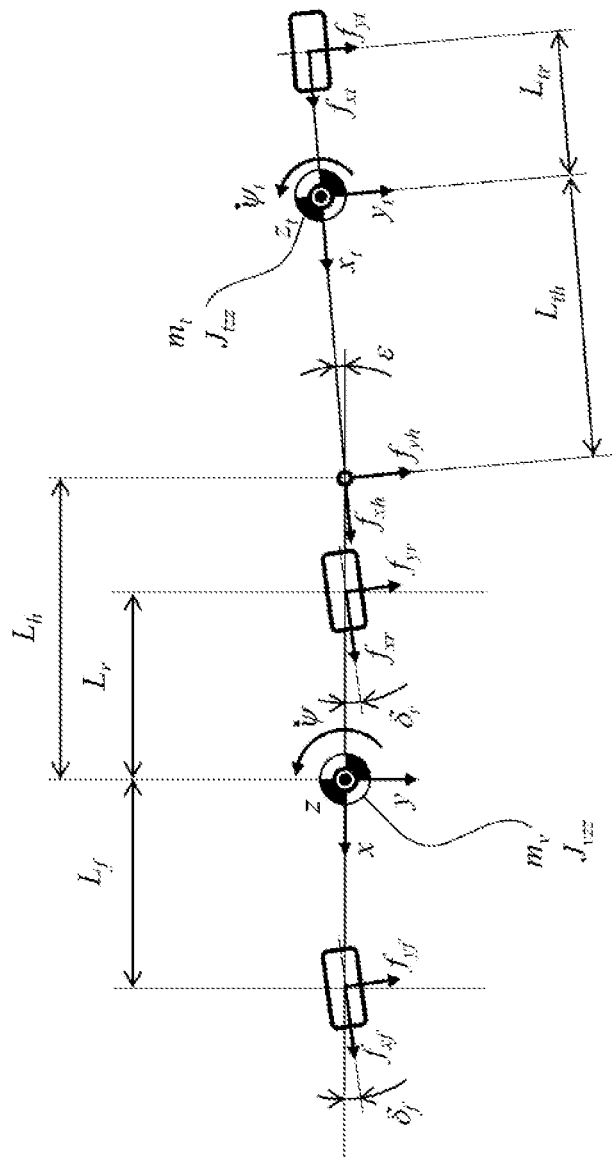
FIG. 5 illustrates each variable in a three-wheeled vehicle model.

FIG. 5 illustrates a three-wheeled vehicle model.

In FIG. 5, x, y, and z are coordinate axes of a coordinate system of the vehicle 10. In this coordinate system, the positive direction of the coordinate axis x corresponds to the frontward direction of the vehicle 10, the positive direction of the coordinate axis y corresponds to the leftward direction of the vehicle 10, and the positive direction of the coordinate axis z corresponds to the upward direction of the vehicle 10.

Further, xt, yt, and zt are coordinate axes of the coordinate system of the trailer 50. In this coordinate system, the positive direction of the coordinate axis xt corresponds to the frontward direction of the trailer 50, the positive direction of the coordinate axis yt corresponds to the leftward direction of the trailer 50, and the positive direction of the coordinate axis zt corresponds to the upward direction of the trailer 50.

Further, Lf represents the distance between the front wheels 11, 11 and the center of gravity 10A of the vehicle, Lr represents the distance between the rear wheels 12, 12 and the center of gravity 10A of the vehicle, Lh represents the distance between the hitch portion 19 and the center of gravity 10A of the vehicle, Lth represents the distance between the hitch portion 19 and the center of gravity 50A of the trailer, and Ltr represents the distance between the running wheels 51, 51 of the trailer 50 and the center of gravity 50A of the trailer.

Further, mv represents the mass of the vehicle 10, Jvzz represents the yaw moment of inertial of the vehicle 10, $\psi$ represents the yaw angle of the vehicle 10 (a dot indicates the yaw angular speed), mt represents the mass of the trailer 50, Jtzz represents the yaw moment of inertial of the trailer 50, and $\psi t$ represents the yaw angle of the trailer 50 (a dot indicates the yaw angular speed).

Further, $\delta f$ represents the steering angle of the front wheels 11, 11 of the vehicle 10, and $\delta r$ represents the steering angle of the rear wheels 12, 12 of the vehicle 10.

Further, fxf represents the longitudinal tier force of the front wheels 11, 11 of the vehicle 10, and has a positive direction corresponding to the frontward direction of the vehicle 10. Then, fyf represents the lateral tier force of the front wheels 11, 11 of the vehicle 10, and has a positive direction corresponding to the leftward direction of the vehicle 10. Then, fxr represents the longitudinal tier force of the rear wheels 12, 12 of the vehicle 10, and has a positive direction corresponding to the frontward direction of the vehicle 10. Then, fyr represents the lateral tier force of the rear wheels 12, 12 of the vehicle 10, and has a positive direction corresponding to the leftward direction of the vehicle 10.

Further, fxh represents the longitudinal hitch force and has a positive direction corresponding to the frontward direction, and fyh represents the lateral hitch force and has a positive direction corresponding to the leftward direction. Further, fxt represents the longitudinal tire force of the running wheels 51, 51 of the trailer 50 and has a positive direction corresponding to the frontward direction of the trailer 50, and fyt represents the lateral tire force of the running wheels 51, 51 of the trailer 50 and has a positive direction corresponding to the leftward direction of the trailer 50.

Further, $\varepsilon$ represents the hitch angle.

Then, the motion equation of the vehicle 10 is established as expressed by an equation 1.

$$m_v \ddot{x} = f_{xf} \cos \delta_f - f_{yf} \sin \delta_f + f_{xr} \cos \delta_r - f_{yr} \sin \delta_r + f_{xh}$$

$$m_v \ddot{y} = f_{xf} \sin \delta_f + f_{yf} \cos \delta_f + f_{xr} \sin \delta_r + f_{yr} \cos \delta_r + f_{yh}$$

$$J_{vzz} \ddot{\psi} = l_f (f_{xf} \sin \delta_f + f_{yf} \cos \delta_f) - l_r (f_{xr} \sin \delta_r + f_{yr} \cos \delta_r) - l_h f_{yh}$$

[Equation 1]

Similarly, the motion equation of the trailer 50 is established as expressed by an equation 2.

$$m_t \ddot{x}_t = f_{xh} \cos \varepsilon + f_{yh} \sin \varepsilon + f_{xt}$$

$$m_t \ddot{y}_t = -f_{xh} \sin \varepsilon + f_{yh} \cos \varepsilon + f_{yt}$$

$$J_{tzz} \ddot{\psi}_t = l_{th}(-f_{xh} \sin \varepsilon + f_{yh} \cos \varepsilon) - l_{tr} f_{yt}$$

[Equation 2]

Now, the motion equation is defined as indicated by an equation 3.

$$\mathbb{M} \ddot{\mathbb{x}} = \mathbb{B}_1 \mathbb{u}_1 + \mathbb{B}_{hy} \mathbb{u}_h$$

$$\mathbb{M}_t \ddot{\mathbb{x}}_t = \mathbb{B}_2 \mathbb{u}_2 + \mathbb{B}_{ht} \mathbb{u}_h$$

[Equation 3]

Each variable in the equation 3 is defined as indicated by an equation 4.

$$\mathbb{M} = \begin{bmatrix} m_v & 0 & 0 \\ 0 & m_v & 0 \\ 0 & 0 & J_{vzz} \end{bmatrix}$$

$$\ddot{\mathbb{x}} = \begin{bmatrix} \ddot{x} \\ \ddot{y} \\ \ddot{\psi} \end{bmatrix}$$

$$\mathbb{B}_1 = \begin{bmatrix} \cos\delta_f & -\sin\delta_f & \cos\delta_r & -\sin\delta_r \\ \sin\delta_f & \cos\delta_f & \sin\delta_r & \cos\delta_r \\ l_f \sin\delta_f & l_f \cos\delta_f & -l_r \sin\delta_r & -l_r \cos\delta_r \end{bmatrix}$$

$$\mathbb{u}_1 = \begin{bmatrix} f_{xf} \\ f_{yf} \\ f_{xr} \\ f_{yr} \end{bmatrix}$$

[Equation 4]

-continued $$\mathbb{B}_{hv} = \begin{bmatrix} 1 & 0 \\ 0 & 1 \\ 0 & -l_r \end{bmatrix}$$

$$u_h = \begin{bmatrix} f_{xh} \\ f_{yh} \end{bmatrix}$$

$$\mathbb{M}_t = \begin{bmatrix} m_t & 0 & 0 \\ 0 & m_t & 0 \\ 0 & 0 & J_{tzz} \end{bmatrix}$$

$$\ddot{x}_t = \begin{bmatrix} \ddot{x}_t \\ \ddot{y}_t \\ \ddot{\psi}_t \end{bmatrix}$$

$$\mathbb{B}_2 = \begin{bmatrix} 1 & 0 \\ 0 & 1 \\ 0 & -l_{tt} \end{bmatrix}$$

$$u_2 = \begin{bmatrix} f_{xt} \\ f_{yt} \end{bmatrix}$$

$$\mathbb{B}_{ht} = \begin{bmatrix} \cos\varepsilon & \sin\varepsilon \\ -\sin\varepsilon & \cos\varepsilon \\ -l_{th}\sin\varepsilon & l_{th}\cos\varepsilon \end{bmatrix}$$

The steering control apparatus 30 can estimate the motion of the trailer 50 according to an equation 6 by using the result of the estimation by an observer (a state estimator) expressed by an equation 5.

$$\hat{u}_h = \frac{\mathbb{M}\ddot{x} - \mathbb{B}_1 u_1}{\mathbb{B}_{hv}} \quad \text{[Equation 5]}$$

$$\ddot{x}_t = \frac{\mathbb{B}_2 u_2 + \mathbb{B}_{ht}\hat{u}_h}{\mathbb{M}_t} \quad \text{[Equation 6]}$$

Then, the steering control apparatus 30 performs the trailer stabilization control (rear-wheel steering control) based on the estimated motion of the trailer 50.

Figure 6:
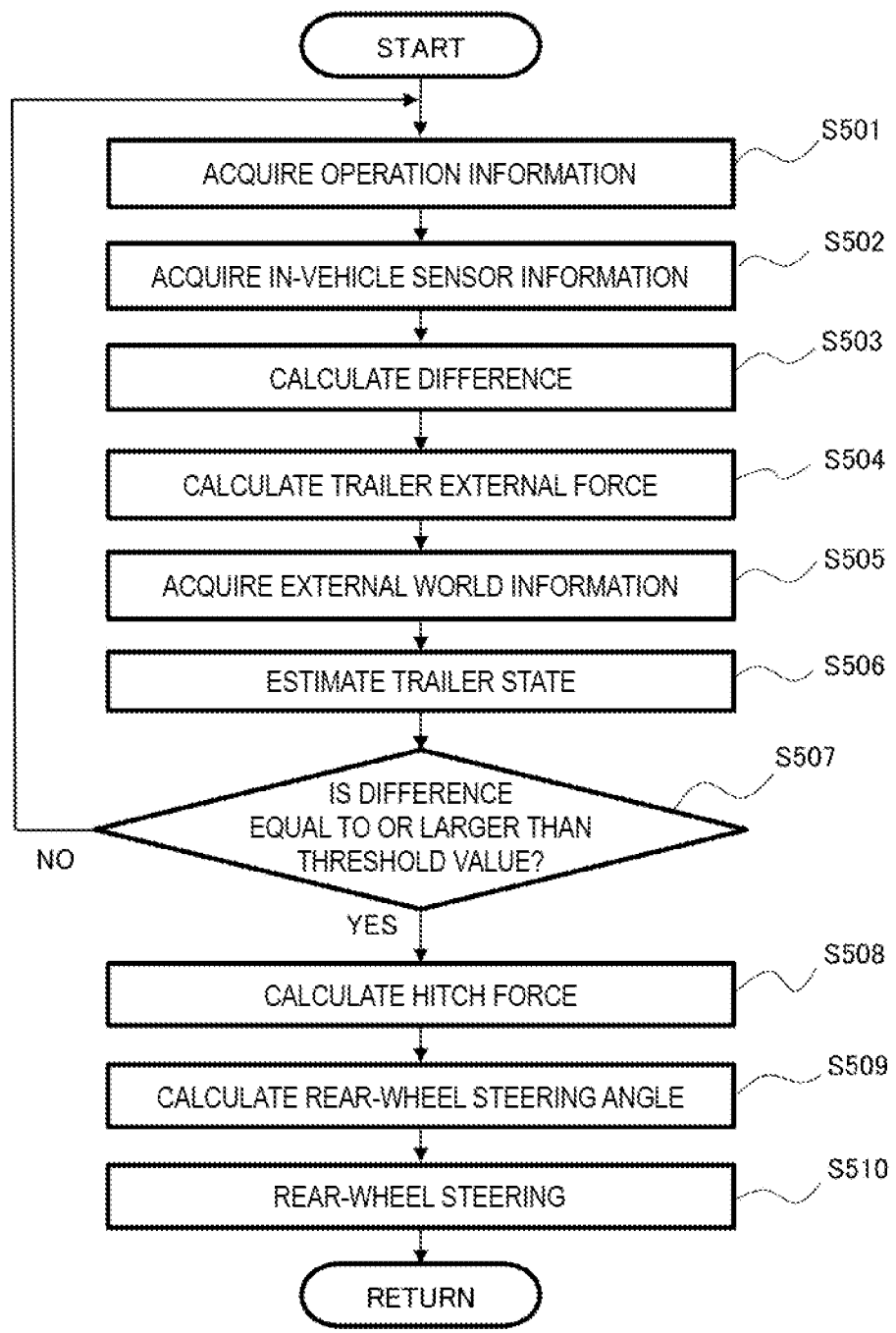
FIG. 6 is a flowchart illustrating a procedure of trailer stabilization control.

FIG. 6 is a flowchart illustrating a procedure of the above-described trailer stabilization control.

First, in step S501, the steering control apparatus 30 acquires the driver's operation information such as the front-wheel steering angle δf.

Further, in step S502, the steering control apparatus 30 acquires the vehicle motion information (in-vehicle sensor information) such as the yaw rate and the vehicle speed of the vehicle 10 detected by the in-vehicle sensor.

Next, in step S503, the steering control apparatus 30 determines the theoretical vehicle response based on the driver's operation information acquired in step S501 and also determines the actual vehicle response based on the vehicle motion information (the in-vehicle sensor information) acquired in step S502, and further calculates the difference between the theoretical vehicle response and the actual vehicle response.

Then, in step S504, the steering control apparatus 30 determines the trailer external force (the force Fh added from the trailer 50 side to the hitch portion 19 and transmitted to the vehicle 10) based on the difference between the theoretical vehicle response and the actual vehicle response.

Further, in step S505, the steering control apparatus 30 acquires information about the relative position of the trailer 50 relative to the vehicle 10 by the external world perception sensor 18.

Then, in step S506, the steering control apparatus 30 estimates the trailer state of the trailer 50 such as the yaw rate based on the trailer external force determined in step S504 and the relative position between the vehicle 10 and the trailer 50.

Next, in step S507, the steering control apparatus 30 calculates the difference between the yaw rate of the vehicle 10 and the yaw rate of the trailer 50, and determines whether the absolute value of the difference exceeds a threshold value.

At this time, if the absolute value of the difference between the yaw rate of the vehicle 10 and the yaw rate of the trailer 50 does not exceed the threshold value, the steering control apparatus 30 returns to step S501 and does not perform the trailer stabilization control.

On the other hand, if the absolute value of the difference between the yaw rate of the vehicle 10 and the yaw rate of the trailer 50 exceeds the threshold value, and the yaw motion of the trailer 50 should be suppressed to improve the stability of the hitch vehicle, in step S508, the steering control apparatus 30 determines the hitch force (a trailer motion compensation hitch force) for suppressing the yaw motion of the trailer 50.

Next, the steering control apparatus 30 proceeds to step S509, and determines a target rear-wheel steering angle δr for generating the hitch force determined in step S508.

Then, the steering control apparatus 30 proceeds to step S510, and controls the rear-wheel steering apparatus 16 (the steering actuator) based on the target rear-wheel steering angle δr determined in step S509.

The steering control apparatus 30 controls the motion of the trailer 50 so as to reduce the difference between the yaw rate of the vehicle 10 and the yaw rate of the trailer 50 by this rear-wheel steering control.

Figure 7:
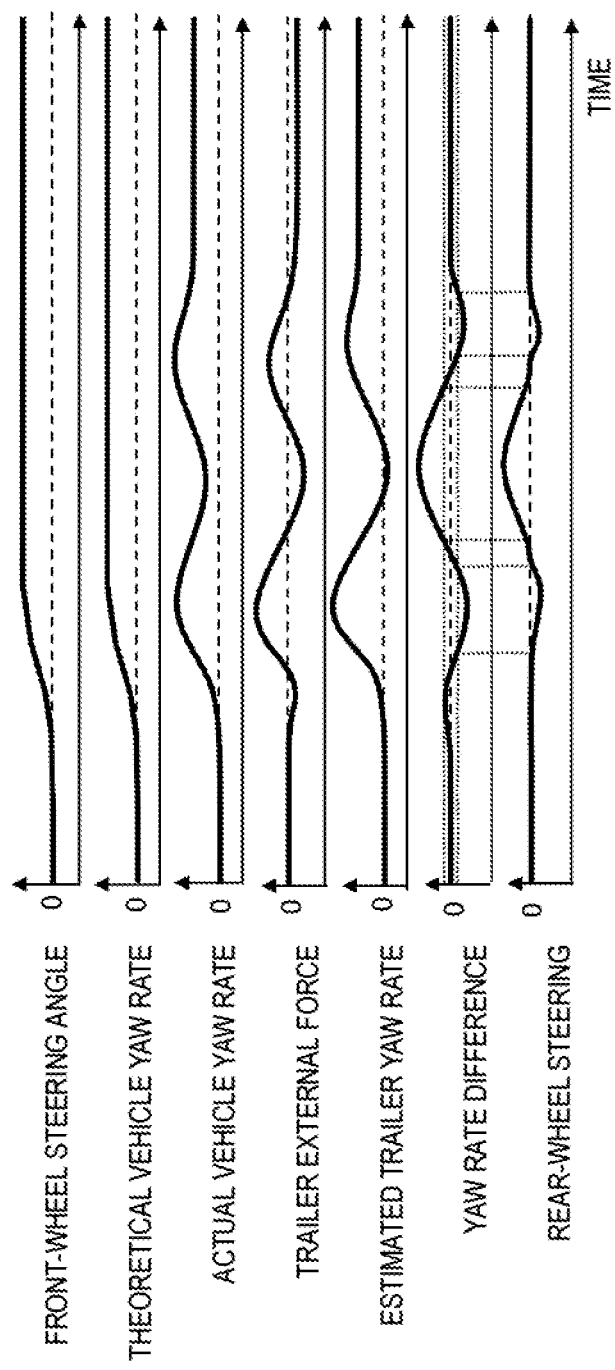
FIG. 7 is a timing chart exemplarily indicating changes in a steering angle, a yaw rate, and a trailer external force in the trailer stabilization control.

FIG. 7 is a timing chart exemplarily indicating changes in the yaw rate and the rear-wheel steering angle when the steering control apparatus 30 performs the trailer stabilization control.

When the driver of the vehicle 10 steers the vehicle 10 and the front-wheel steering angle δf changes, the response of the theoretical vehicle yaw rate (the theoretical vehicle response) of the vehicle 10 alone that the steering control apparatus 30 calculates based on the vehicle speed and the vehicle specifications changes according to the change in the front-wheel steering angle δf.

At this time, when the trailer 50 is hitched to the vehicle 10, the actual yaw rate of the vehicle 10 exhibits a behavior different from the theoretical vehicle yaw rate because the vehicle 10 receives the external force from the trailer 50 (the trailer external force). Then, when the rolling motion occurs on the trailer 50, this causes a periodic change in the trailer external force, thereby also causing a periodic change in the actual yaw rate of the vehicle 10.

At this time, the estimated value of the yaw rate of the trailer 50 that is calculated by the steering control apparatus 30 indicates the change according to the trailer external force.

At this time, the steering control apparatus 30 determines the difference between the theoretical vehicle yaw rate and the estimated trailer yaw rate, and outputs the instruction for the rear-wheel steering angle for generating the periodic yaw rate opposite in phase from the rolling motion when the difference exceeds the threshold value.

The yaw rate of the trailer 50 is stabilized by this rear-wheel steering control.

The trailer stabilization control by the steering control apparatus 30 controls the steering angle of the rear wheels 12, 12, and therefore can prevent a change in the speed of the vehicle 10 according to the trailer stabilization control.

Further, because the yaw moment generable by the control on the rear-wheel steering angle is larger than the yaw moment generable by the autonomous brake, the present configuration allows the vehicle 10 hitched to the large trailer 50 to stably run more effectively than when the yaw moment is generated by the autonomous brake.

Each of the configurations described in the above-described embodiments can be arbitrarily combined within a range not creating a contradiction.

Further, having described the content of the present invention specifically with reference to the preferred embodiments thereof, it is apparent to those skilled in the art that the present invention can be embodied by various modifications based on the basic technical idea and teaching of the present invention.

The trailer stabilization control system can suppress the yaw motion of the trailer 50 with the aid of the rear-wheel steering control by the steering control apparatus 30 and the autonomous brake control. Then, the trailer stabilization control system can add the yaw moment generated by the autonomous brake when the yaw moment generable with the aid of the rear-wheel steering control by the steering control apparatus 30 is insufficient to suppress the yaw motion of the trailer 50.

The present invention shall not be limited to the above-described embodiments, and includes various modifications. For example, the above-described embodiment has been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each of the embodiments can also be implemented with another configuration added, deleted, or replaced with respect to a part of the configuration of this embodiment.

The present application claims priority under the Paris Convention to Japanese Patent Application No. 2018-164588 filed on Sep. 3, 2018. The entire disclosure of Japanese Patent Application No. 2018-164588 filed on Sep. 3, 2018 including the specification, the claims, the drawings, and the abstract is incorporated herein by reference in its entirety.

REFERENCE SIGNS LIST 10 vehicle
11, 11 front wheel
12, 12 rear wheel
14 front-wheel steering apparatus
16 rear-wheel steering apparatus
18 external world perception sensor
19 hitch portion
30 steering control apparatus

The invention claimed is:

1. A steering control apparatus for a vehicle configured to tow a trailer, wherein the steering control apparatus
acquires information regarding a yaw motion of the trailer, and
outputs an instruction for generating a periodic yaw moment opposite in phase from the yaw motion of the trailer and of the magnitude corresponding to the yaw motion of the trailer to a rear-wheel steering apparatus configured to control a steering angle of a rear wheel of the vehicle based on the acquired information regarding the yaw motion of the trailer,
wherein the steering control apparatus determines the yaw motion of the trailer based on an external force of the trailer that is applied to a hitch portion connecting the vehicle and the trailer and information regarding an external world around the vehicle that is acquired by an external world perception portion;
wherein the steering control apparatus determines the external force of the trailer based on an estimated yaw rate of the vehicle alone and a yaw rate actually generated on the vehicle as a hitch vehicle including the vehicle and the trailer.

2. The steering control apparatus according to claim 1, wherein the steering control apparatus generates the periodic yaw moment opposite in phase from the yaw motion of the trailer with use of a force at the hitch portion connecting the vehicle and the trailer.

3. A steering control method for a vehicle configured to tow a trailer, the steering control method comprising:
acquiring information regarding a yaw motion of the trailer; and
outputting an instruction for generating a periodic yaw moment opposite in phase from the yaw motion of the trailer and of the magnitude corresponding to the yaw motion of the trailer to a rear-wheel steering apparatus configured to control a steering angle of a rear wheel of the vehicle based on the acquired information regarding the yaw motion of the trailer,
wherein the steering control method determines the yaw motion of the trailer based on an external force of the trailer that is applied to a hitch portion connecting the vehicle and the trailer and information regarding an external world around the vehicle that is acquired by an external world perception portion;
wherein the steering control method determines the external force of the trailer based on an estimated yaw rate of the vehicle alone and a yaw rate actually generated on the vehicle as a hitch vehicle including the vehicle and the trailer.

4. A steering control system for a vehicle configured to tow a trailer, the steering control system comprising:
a vehicle motion state acquisition portion configured to acquire information regarding a motion state of the vehicle;
an external world perception portion configured to acquire information regarding an external world around the vehicle;
a steering control portion configured to acquire information regarding a yaw motion of the trailer that is determined based on the information regarding the motion state of the vehicle acquired by the vehicle motion state acquisition portion and the information regarding the external world around the vehicle acquired by the external world perception portion, and output an instruction for generating a periodic yaw moment opposite in phase from the yaw motion of the trailer and of the magnitude corresponding to the yaw motion of the trailer based on the acquired information regarding the yaw motion of the trailer; and
a rear-wheel steering apparatus configured to acquire the instruction output from the steering control portion and control a steering angle of a rear wheel of the vehicle,
wherein the steering control system determines the yaw motion of the trailer based on an external force of the trailer that is applied to a hitch portion connecting the vehicle and the trailer and information regarding an external world around the vehicle that is acquired by an external world perception portion;

wherein the steering control system determines the external force of the trailer based on an estimated yaw rate of the vehicle alone and a yaw rate actually generated on the vehicle as a hitch vehicle including the vehicle and the trailer.

\* \* \* \* \*